March 24, 1925.
F. H. BAUMGARD
1,530,710
CANDY MAKING MACHINERY
Filed Sept. 14, 1920
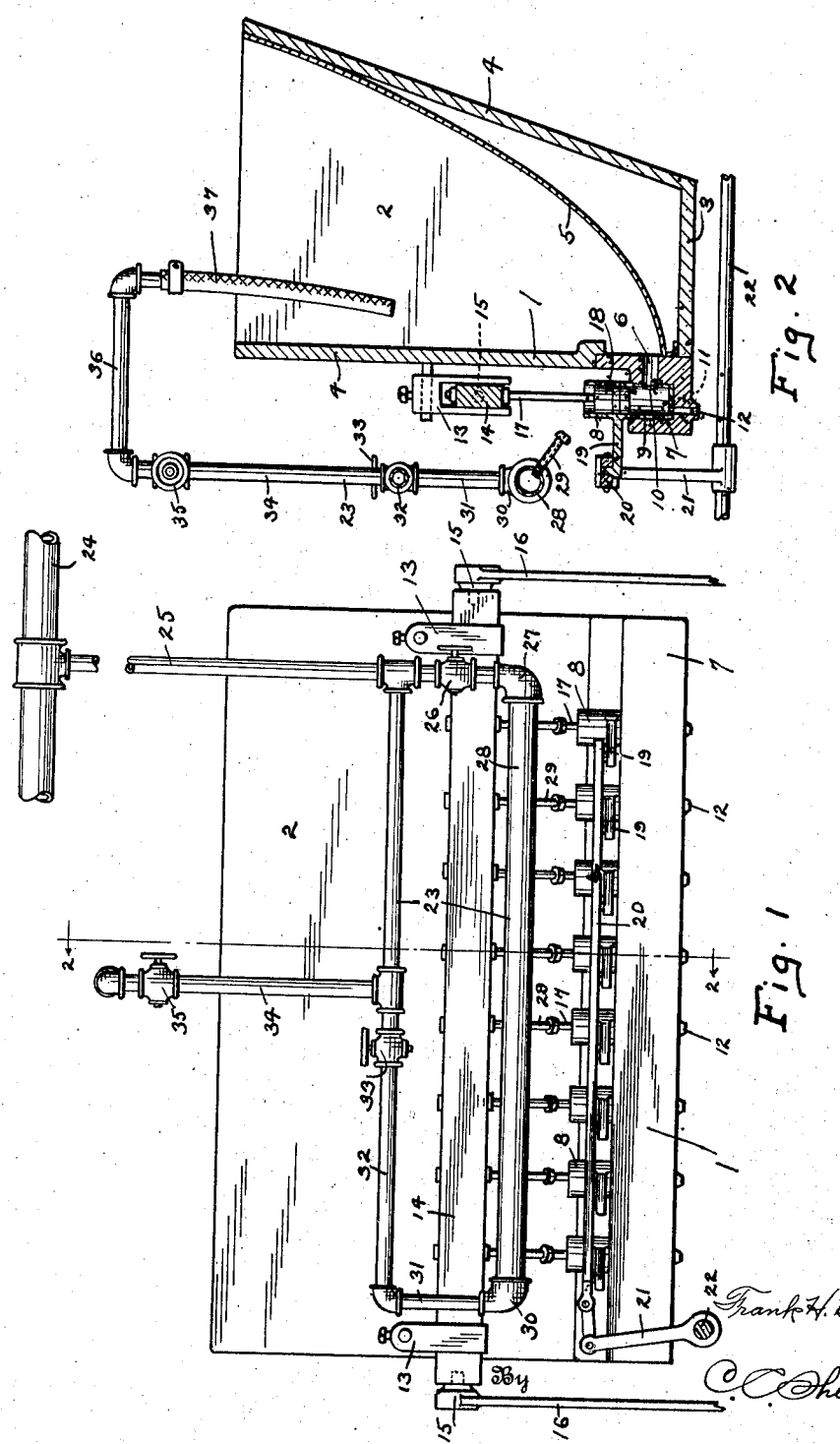

Patented Mar. 24, 1925.

1,530,710

UNITED STATES PATENT OFFICE.

FRANK H. BAUMGARD, OF COLUMBUS, OHIO.

CANDY-MAKING MACHINERY.

Application filed September 14, 1920. Serial No. 410,129.

*To all whom it may concern:*

Be it known that FRANK H. BAUMGARD, a citizen of the United States, residing at Columbus, in the county of Franklin and State of Ohio, has invented certain new and useful Improvements in Candy-Making Machinery, of which the following is a specification.

This invention relates to improvements in candy making machinery, and has particular reference to machines of this character wherein are embodied retaining hoppers and discharge openings, together with pump mechanism for causing a positive flow of the more or less plastic candy from the hoppers through the openings, and the invention has for its primary object to provide in conjunction with a machine of this character means whereby steam may be introduced into engagement with the candy engaging portions of the pump mechanism, whereby said pump mechanism will be enabled to be maintained free from candy coatings or coverings, which have a tendency to cause the pump mechanism to bind or stick and thereby interfere with the successful operation of the machine.

It is well known that in the use of candy forming machines of the above character the pump mechanisms thereof are very apt to bind by reason of the collection or hardening of candy deposit within the pump cylinders, which deposit accumulates and forms to such degree that the operation of the pump pistons is rendered extremely difficult and that the machines frequently require repair by reason of the stresses imparted thereto when power is applied and the pump mechanisms fail to properly reciprocate. Therefore, in order to obviate this difficulty, and others, the present invention resides particularly in the provision of a pipe structure in combination with such a machine whereby steam may at desired intervals or periods be introduced into the pumps so that any hardened candy deposit contained within the latter may be softened or removed from the pump walls or from around the pistons thereof, whereby through the removal of this deposit in the manner stated, the pump mechanisms will be enabled to freely and readily reciprocate to effect a positive ejection of the candy in a more or less fluidal or mobile state from the discharge openings of the machine.

Still a further object of the invention resides in mechanism of the aforesaid character which will be operable to increase the efficiency of candy storage or supplying machines, to enable the same to function in a positive, regular and efficient manner, and to provide valve mechanism whereby the action of the steam supplying means may be readily governed in accordance with the needs of the machine.

With these and other objects in view, as will appear as the description proceeds, the invention further consists in the novel features of construction, combinations of elements and arrangements of parts, hereinafter to be fully described and to have the scope thereof pointed out in the appended claim.

In the accompanying drawing, forming a part of this specification, and in which similar characters of reference denote like and corresponding parts:

Figure 1 is a side elevation of a candy dispensing machine and illustrating more particularly the application of the improved steam injecting structure comprising the present invention thereto, and Figure 2 is a vertical transverse sectional view taken on the line 2—2 of Figure 1.

In the drawings the numeral 1 designates a candy dispensing machine in its entirety. This machine is now in general use and is employed for the purpose of receiving suitable batches of candy making material in a more or less fluidal state, and provides means whereby such material may be withdrawn from the machine and deposited within suitable molds, in order that confection of various forms may be produced, and to eliminate the element of manual handling of the candy during its process of formation.

As is well known, machines of this nature comprise a hopper or magazine 2, in which the candy is suitably placed. This hopper is formed to include an open top, a closed bottom 3 and vertical side walls 4, which are so assembled as to constitute a container of any desired size for the purpose of receiving the candy mixtures. The interior of the hopper is provided with a curved wall 5, which extends downwardly and terminates contiguous to a plurality of outlet openings 6 provided in the longitudinally extending discharge members 7 of the hopper. To control the flow of the material through the openings 6, the member 7 is provided, as is usual, with a plurality of cylinders 8, which are mounted for oscillation within sockets 9 formed in the member 7. It will be observed that the cylinders 8 are provided with ports 10 which are capable of registering with the openings 6, in order that the candy material from the hopper 2 may flow into the cylinders 8. Also, the bottoms of the cylinders 8 are provided with discharge ports 11, which are capable of registering with outlet nozzles 12 provided vertically in the lower wall of the member 7. Molds, not shown, are arranged to pass beneath the nozzles 12 so as to receive the material discharged from the latter and to mold said material into suitable and desirable forms.

Inasmuch as the candy forming material is usually of a more or less thick viscous nature, the machine 1 embodies means whereby the flow thereof from the machine will be rendered positive and to eliminate the uncertainty usually involved in simply relying upon the forces of gravity in causing the flow of material. To provide such a positive flow, one of the walls 4 of the hopper is provided with a pair of fixed guides 13, in which is mounted for vertical reciprocation a plunger bar 14. The outer ends of this bar are pivotally connected as at 15 with a pair of links 16, the latter extending to suitable eccentric mechanism, not shown, whereby the rise and fall of the bar 14 within the guides may be effected. This bar is provided with a plurality of rigidly depending rods 17, which have their lower ends connected wth piston heads 18, the latter being mounted for vertical reciprocation within the cylinders 8. Also, the cylinders 8 are provided with fixed crank arms 19, which are connected together by means of a longitudinally extending link 20, which latter has one of its ends connected with a crank arm 21 mounted upon an actuating shaft 22. By this construction the machine is timed to operate so that upon the up stroke of the pistons the inlet ports 10 of the cylinders 8 will be in registration with the discharge openings 6 of the hopper, so that a suitable quantity of the candy forming material may be drawn into the cylinders. Before the down stroke of the pistons, the shaft 22 is rotated so as to longitudinally move the link 20, thereby causing the cylinders 8 to rotate in their sockets so that the opening 6 will be closed by the cylinder walls, and the discharge ports 11 of said cylinders will be brought into registration with the nozzles 12. Then, upon the down stroke of the pistons the material contained within the cylinders will be forced out of the latter through the nozzles 12 and discharged into the molds, not shown, passing underneath said nozzles.

The construction of the machine 1 so far described is well known in the art and hence the same is not claimed in itself hereinafter. More particularly, the present invention consists in the provision of novel means for enabling the pistons 18 to properly function at all times, and to prevent the same from sticking or binding in the cylinders 8 by reason of candy deposit within the latter. It frequently happens that in the operation of dispensing machines of this nature the movements of the machine will be arrested for certain periods of time. It has then been found that when the machine is idle for such periods the candy forming material therein collects and hardens upon the inner walls of the cylinders 8 and around the pistons 18. When this condition occurs it is obvious that the motion of the pistons is interfered with and that the machine has to be carefully started by a series of intermittent movements to loosen the pistons. This causes the machine to be placed under considerable stress, and frequently results in the breaking of various parts thereof.

Therefore, in order to overcome these difficulties and to enable the machine to readily start, the present invention consists primarily in the provision of a pipe structure 23 through which steam is permitted to circulate and to be discharged into the open upper ends of the cylinders 8, in such manner that any candy deposit within the cylinders will be loosened and removed and to thereby prevent the sticking or adhering of the pistons to the walls of the cylinders. As shown, the structure 23 comprises a steam main 24, to which steam is supplied from any suitable source. Leading from the main 24 is a pipe 25 in which is located a control valve 26, said pipe 25 terminating in an elbow 27. A steam header 28 is connected with the elbow 27 and is adapted to receive a source of steam supply from the main 24 by way of the pipe 25. Projecting angularly from the header 28 and spaced longitudinally thereof is a plurality of tangentially disposed steam jets 29, which jets are so positioned that their terminate ends will discharge into the open upper ends of the cylinders 8. Obviously, in view of the foregoing it will be apparent that the opening of the valve 26 will permit steam under suitable pressure to issue from the jets 29, and be discharged directly into the cylinders 8. By this construction the steam discharged into said cylinders, will serve to loosen or remove any of the caked deposit found in the latter, or to soften the deposit to such extent that the same will in no manner unduly interfere with the freedom of operation of the pistons 18. The steam has a softening influence upon the candy deposit and therefore before the machine is operated, the steam is turned on by opening the valve 26 and by subjecting the interior of the cylinders for a short time to the action of the steam the power of the machine may be turned on with full force without in any way damaging or injuring the pump mechanism.

Preferably, the other end of the steam header 28, opposite to the elbow 27, is provided with a second elbow 30 with which is connected a short vertical pipe 31, which leads to a longitudinally extending pipe 32 disposed above and in parallel relation with the header 28. The pipe 32 is connected by means of a T connection with a vertically extending pipe 25 and midway of its length the pipe 32 is provided with a valve 33, which is adapted to be opened simultaneously with the valve 26 permitting of steam flow from the pipe 27 into both ends of the header 28 from which the steam is discharged in a uniform manner from the jets 29.

To clean the interior of the hopper of accumulated candy deposit and also to maintain the opening 6 in a cleared and unobstructed condition, a pipe 34 is connected by means of a T coupling with the pipe 32. This pipe 34 extends vertically upward and is provided with a control valve 35 which permits of the passage of steam into a second horizontally extending pipe 36. The end of this pipe is equipped with a hose or the like 37, whereby upon the opening of the valve 35 steam will be forced through the hose 37 and thereby sprayed along the interior of the hopper for the purpose aforesaid.

In view of the foregoing description, taken in connection with the accompanying drawing, it will be apparent that there is provided improved and simplified mechanism for carrying out the objects of the invention, and all of the advantages above mentioned are, among others, present. The apparatus for injecting the steam into the pump mechanism may be conveniently associated with standard forms of candy dispensing machines and are so positioned as to be out of the way and to offer no obstruction to the successful operation or convenience in handling the machine 1. Ordinarily, the steam spraying apparatus is only employed immediately prior to the starting of the machine but this is a matter of convenience and steam may be utilized at any time the same is deemed desirable.

I claim:

In a candy dispensing machine, a hopper, cylinders connected with the hopper for permitting the passage of material therefrom, a header extending longitudinally of the hopper and having jets carried thereby for directing steam into the upper ends of the cylinders, a pipe arranged in parallel relation with the header and in communication at each end therewith, a steam supply pipe common to the header and said pipe, and a pipe connected with the first named pipe for conducting steam to the hopper.

In testimony whereof I affix my signature.

FRANK H. BAUMGARD.